United States Patent
Matsui et al.

(10) Patent No.: US 10,454,311 B2
(45) Date of Patent: Oct. 22, 2019

(54) POWER TRANSMITTING APPARATUS

(71) Applicant: FUJITSU LIMITED, Kawasaki-shi, Kanagawa (JP)

(72) Inventors: Kiyoto Matsui, Miki (JP); Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/236,655

(22) Filed: Aug. 15, 2016

(65) Prior Publication Data

US 2016/0352154 A1 Dec. 1, 2016

Related U.S. Application Data

(63) Continuation of application No. PCT/JP2014/054185, filed on Feb. 21, 2014.

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 50/40* (2016.02); *H02J 50/90* (2016.02); *H04B 5/0037* (2013.01); *H01F 38/14* (2013.01)

(58) Field of Classification Search
CPC ......... H04B 5/0037; H04B 5/00; H04B 7/26; H02J 5/005; H02J 5/00; H02J 17/00; H02J 7/02; H02J 7/025; H04W 4/00
(Continued)

(56) References Cited

U.S. PATENT DOCUMENTS

2008/0265684 A1* 10/2008 Farkas .................... B60L 58/40
                                                            307/104
2010/0033021 A1* 2/2010 Bennett .................. H02J 17/00
                                                            307/104
(Continued)

FOREIGN PATENT DOCUMENTS

JP      S60-70803      4/1985
JP      H02-246743    10/1990
(Continued)

OTHER PUBLICATIONS

International Search Report for International Application No. PCT/JP2014/054185 dated May 20, 2014.
(Continued)

*Primary Examiner* — Fritz M Fleming
*Assistant Examiner* — Jagdeep S Dhillon
(74) *Attorney, Agent, or Firm* — Kratz, Quintos & Hanson, LLP

(57) ABSTRACT

A power transmitting apparatus includes a plurality of primary-side resonant coils disposed along a conveyance path of a plurality of electronic devices and configured to utilize magnetic field resonance to transmit electric power to secondary-side resonant coils of the respective electronic devices conveyed along the conveyance path; and a plurality of phase adjusters connected between an alternating-current source and the respective primary-side resonant coils and configured to respectively adjust phases of the electric power, supplied to the primary-side resonant coils from the alternating-current source, so as to uniform the phases of the electric power, supplied to the primary-side resonant coils from the alternating-current source.

10 Claims, 10 Drawing Sheets

(51) Int. Cl.
  H02J 50/40 (2016.01)
  H02J 50/90 (2016.01)
  H04B 5/00 (2006.01)
  H01F 38/14 (2006.01)

(58) Field of Classification Search
  USPC .... 307/149, 104, 109, 66, 64, 82; 363/21.02
  See application file for complete search history.

(56) References Cited

U.S. PATENT DOCUMENTS

| | | | |
|---|---|---|---|
| 2010/0201204 A1 | 8/2010 | Sakoda | |
| 2012/0069606 A1* | 3/2012 | Sagneri | H02M 3/158 363/21.02 |
| 2015/0001949 A1* | 1/2015 | Leabman | H02J 17/00 307/104 |
| 2015/0102681 A1* | 4/2015 | Leabman | H04B 5/0037 307/104 |
| 2016/0099602 A1* | 4/2016 | Leabman | H02J 7/025 307/104 |
| 2016/0099613 A1* | 4/2016 | Bell | H02J 7/025 307/104 |
| 2016/0099614 A1* | 4/2016 | Leabman | H01Q 1/243 307/104 |
| 2016/0099756 A1* | 4/2016 | Leabman | H04B 5/0037 307/104 |
| 2016/0099757 A1* | 4/2016 | Leabman | H04B 5/0037 307/104 |
| 2016/0190815 A1* | 6/2016 | Keeling | H02J 5/005 307/104 |
| 2016/0191121 A1* | 6/2016 | Bell | H04B 5/0037 307/104 |
| 2017/0141584 A1* | 5/2017 | DeVaul | H04W 76/14 |
| 2017/0179763 A9* | 6/2017 | Leabman | H02J 50/40 |

FOREIGN PATENT DOCUMENTS

| | | |
|---|---|---|
| JP | 2001-309501 A1 | 11/2001 |
| JP | 2005-198185 A1 | 7/2005 |
| JP | 2005-312285 A1 | 11/2005 |
| JP | 2010-183814 A1 | 8/2010 |
| JP | 2011-199975 A1 | 10/2011 |
| JP | 2011-205750 A1 | 10/2011 |
| JP | 2012-65419 A1 | 3/2012 |

OTHER PUBLICATIONS

Written Opinion of the International Searching Authority for International Application No. PCT/JP2014/054185 dated May 20, 2014 (7 Sheets total, 3 Sheets translation).
Office Action dated Oct. 24, 2017 with respect to corresponding Japanese Patent Application No. 2016-503856 (3 Sheets, 4 Sheets translation, 7 Sheets total).

* cited by examiner

POWER TRANSMITTING APPARATUS

CROSS-REFERENCE TO RELATED APPLICATION

This application is a continuation application of International Application PCT/JP2014/054185 filed on Feb. 21, 2014 and designated the U.S., the entire contents of which are incorporated herein by reference.

FIELD

The embodiments discussed herein relate to a power transmitting apparatus.

BACKGROUND

A conventional noncontact power transmitting apparatus has M (M is an integer number equal to or greater than 2) power transmitting circuits and a control unit that controls the M power transmitting circuits. Each power transmission circuit includes a transmission-side LC tank circuit having a capacitor and a power transmission coil connected in series, and an oscillation circuit that supplies power to the transmission-side LC tank circuit. The power transmission coils of the M power transmission circuits are arranged in a matrix formation. The control circuit controls phases of signals generated by the respective oscillation circuits of the M power transmission circuits so that the phases of changes in the magnetic fields from at least two power transmission coils of the power transmission coils of the M power transmission circuits are identical at a power reception coil of a power reception circuit (for example, see patent document 1).

However, in a case where a phase of the magnetic field is set to be identical at a reception coil of one reception circuit in the conventional noncontact power transmitting apparatus, a phase of the magnetic field is not identical at a reception coil of another reception circuit located at another place. Thus, it is difficult to effectively transmit electric power to the reception coils of the plurality of reception circuits at the same time.

RELATED-ART DOCUMENTS

Patent Documents

[Patent Document 1] Japanese Laid-open Patent Publication No. 2011-199975

SUMMARY

According to an aspect of the embodiments, a power transmitting apparatus includes a plurality of primary-side resonant coils disposed along a conveyance path of a plurality of electronic devices and configured to utilize magnetic field resonance to transmit electric power to secondary-side resonant coils of the respective electronic devices conveyed along the conveyance path; and a plurality of phase adjusters connected between an alternating-current source and the respective primary-side resonant coils and configured to respectively adjust phases of the electric power, supplied to the primary-side resonant coils from the alternating-current source, so as to make uniform the phases of the electric power, supplied to the primary-side resonant coils from the alternating-current source.

DESCRIPTION OF EMBODIMENT

Hereinafter, embodiments to which a power transmitting apparatus of the present invention is applied will be described.

First Embodiment

Figure 1:
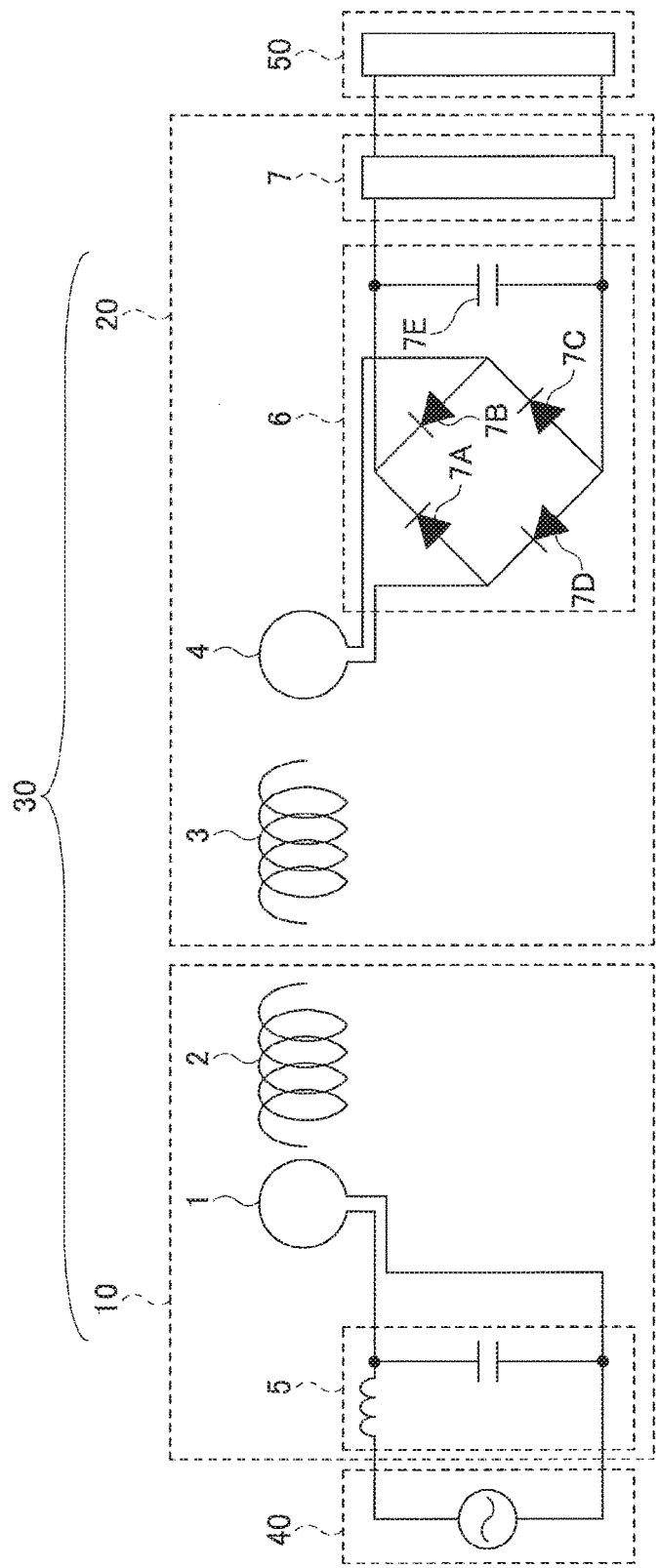
FIG. 1 is a diagram illustrating a configuration of a charging system that utilizes magnetic-field resonance.
Figure 2:
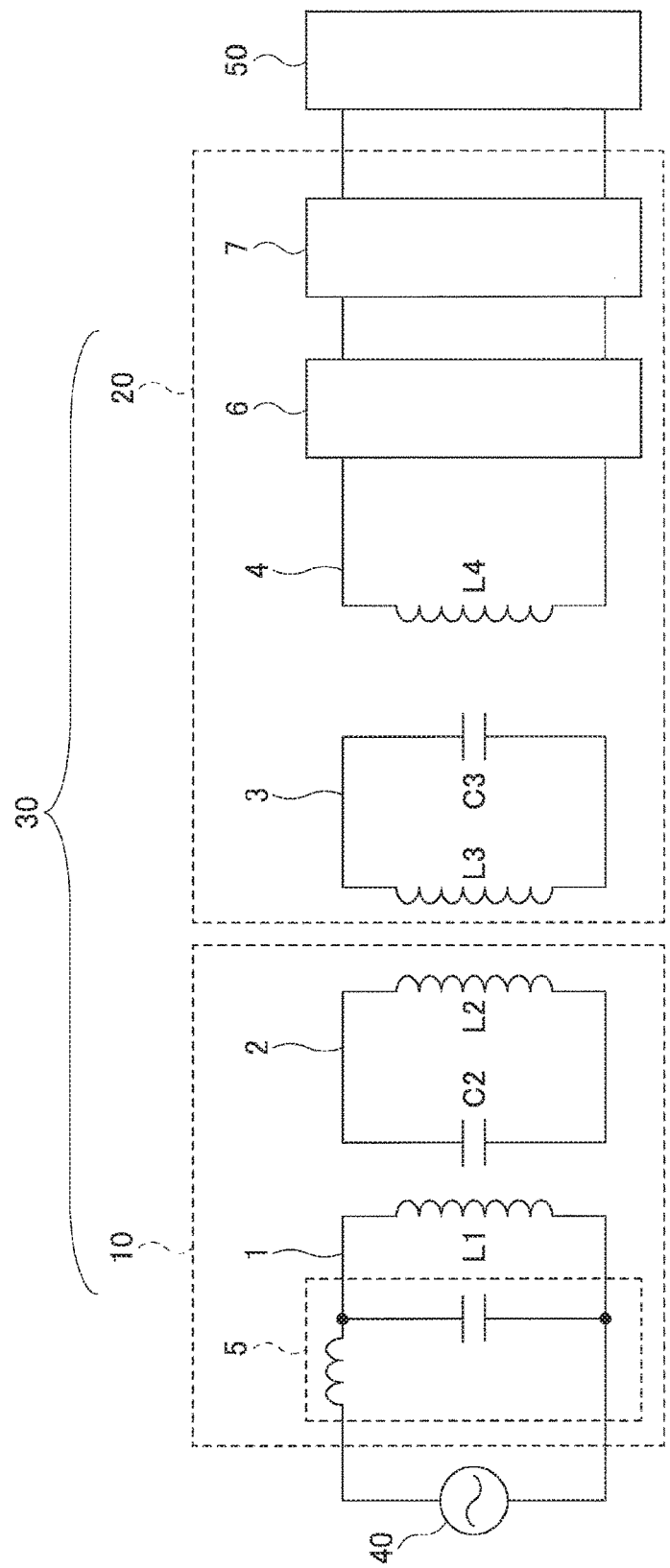
FIG. 2 is a diagram illustrating an equivalent circuit of the charging system illustrated in FIG. 1.

FIG. 1 is a diagram illustrating a configuration of a charging system 30 that utilizes magnetic-field resonance, and FIG. 2 is a diagram illustrating an equivalent circuit of the charging system 30 illustrated in FIG. 1.

As illustrated in FIG. 1, the charging system 30 according to a first embodiment includes a power transmitter 10 and a power receiver 20.

The power transmitter 10 includes a primary-side coil 1, a primary-side resonant coil 2, and a matching circuit 5. An alternating-current (AC) power source 40 is connected to the power transmitter 10. The power transmitter 10 transmits, to the power receiver 20, electric power that the AC power source 40 outputs.

The power receiver 20 includes a secondary-side resonant coil 3, a secondary-side coil 4, a rectifier circuit 6, and a DC/DC converter 7. A battery 50 is connected to the power receiver 20. The power receiver 20 receives the electric power transmitted from the power transmitter 10 to output the electric power to the battery 50.

Initially, the primary-side coil 1, the primary-side resonant coil 2, and the matching circuit 5, which are included in the power transmitter 10, and the AC power source 40 are described.

As illustrated in FIG. 1, the primary-side coil 1 is a loop-shaped coil. The primary-side coil 1 is connected to the AC power source 40 via the matching circuit 5 between two ends of the primary-side coil 1. The primary-side coil 1 is disposed close to but not in contact with the primary-side resonant coil 2. The primary-side coil 1 is electromagnetically coupled with the primary-side resonant coil 2. The primary-side coil 1 is disposed such that the central axis of the primary-side coil 1 matches the central axis of the primary-side resonant coil 2. The central axis of the primary-side coil 1 and the central axis of the primary-side resonant coil 2 are made identical to each other in order to suppress leakage of magnetic flux and to suppress unnecessary generation of magnetic fields around the primary-side coil 1 and the primary-side resonant coil 2 as well as improving the coupling strength between the primary-side coil 1 and the primary-side resonant coil 2.

Further, as illustrated in the equivalent circuit of FIG. 2, the primary-side coil 1 may be depicted as an inductance L1 coil. Although the primary-side coil 1 in practice includes a resistance component and a capacitor component, illustration of these components is omitted from FIG. 2.

The primary-side coil 1 generates magnetic fields by alternating-current (AC) power supplied from the AC power source 40 via the matching circuit 5, and transmits the electric power to the primary-side resonant coil 2 by electromagnetic induction (mutual induction).

As illustrated in FIG. 1, the primary-side resonant coil 2 is disposed close to but not in contact with the primary-side coil 1. The primary-side resonant coil 2 is electromagnetically coupled with the primary-side coil 1. Further, the primary-side resonant coil 2 has a predetermined resonance frequency and is designed to have a very high Q value. The resonance frequency of the primary-side resonant coil 2 is set to be equal to the resonance frequency of the secondary-side resonant coil 3. In FIG. 1, the two ends of the primary-side resonant coil 2 are open for facilitating viewability. However, a capacitor for adjusting the resonance frequency may be connected in series between the two ends of the primary-side resonant coil 2.

The primary-side resonant coil 2 is arranged to face the secondary-side resonant coil 3 at a predetermined interval. The interval between the primary-side resonant coil 2 and the secondary-side resonant coil 3 may, for example, be several meters. When the resonance Q of the primary-side resonant coil 2 and the secondary-side resonant coil 3 is sufficiently high, the electric power may be transmitted by magnetic field resonance even when the distance between the primary-side resonant coil 2 and the secondary-side resonant coil 3 is several meters.

Further, a state of the magnetic field resonance becomes the best condition in a case where the central axis of the primary-side resonant coil 2 and the central axis of the secondary-side resonant coil 3 are identical to each other. However, in the magnetic field resonance system, it is possible to transmit the electric power even when the central axis of the primary-side resonant coil 2 and the central axis of the secondary-side resonant coil 3 are misaligned. This is a merit relative to the electromagnetic induction system. That is, the magnetic field resonance system has an advantage of handling a position gap between the primary-side resonant coil 2 and the secondary-side resonant coil 3.

Further, as illustrated in the equivalent circuit of FIG. 2, the primary-side resonant coil 2 may be depicted as a loop circuit including an inductance L2 coil and a capacitor having a capacitance C2. The capacitance C2 represents the capacitance of a capacitor connected between the two ends of the primary-side resonant coil 2 for adjusting frequencies. Although the primary-side resonant coil 2 in practice includes a resistance component, illustration of the resistance component is omitted from FIG. 2.

The resonance frequency of the primary-side resonant coil 2 is set to be identical to the frequency of the AC power that the AC power source 40 outputs. The resonance frequency of the primary-side resonant coil 2 is determined depending on the capacitance C2 and the inductance L2 of the primary-side resonant coil 2. Hence, the capacitance C2 and the inductance L2 of the primary-side resonant coil 2 are set such that the resonance frequency of the primary-side resonant coil 2 is identical to the frequency of the AC power output from the AC power source 40.

Note that in a case where the resonance frequency is set by the parasitic capacitance alone and the stray capacitance of the primary-side resonant coil 2 is able to be fixed, the two ends of the primary-side resonant coil 2 may be open.

The matching circuit 5 is inserted for matching impedance of the primary-side coil 1 and that of the AC power source 40, and includes an inductor L and a capacitor C.

The AC power source 40 serves as a power source to output AC power of the frequency necessary for the magnetic field resonance, and includes an amplifier to amplify the output power. The AC power source 40 may, for example, output high frequency AC power from several hundreds kHz to several tens MHz.

The power transmitter 10, which includes the above-described primary-side coil 1, the primary-side resonant coil 2, and the matching circuit 5, transmits, to the primary-side resonant coil 2 with magnetic induction, the AC power supplied from the AC power source 40 to the primary-side coil 1, and transmits the electric power from the primary-side resonant coil 2 to the secondary-side resonant coil 3 of the power receiver 20 with magnetic field resonance.

Next, the secondary-side resonant coil 3, the secondary-side coil 4, the rectifier circuit 6, the DC/DC converter 7, and the battery 50 that are included in the power receiver 20 are described.

As illustrated in FIG. 1, the secondary-side resonant coil 3 included in the power receiver 20 is arranged to face the primary-side resonant coil 2 at the predetermined interval.

In FIG. 1, the two ends of the secondary-side resonant coil 3 are open for facilitating viewability. However, a capacitor for adjusting the resonance frequency may be connected in series between the two ends of the secondary-side resonant coil 3.

The secondary-side resonant coil 3 has a resonance frequency identical to that of the primary-side resonant coil 2, and is designed to have a very high Q value.

The interval between the secondary-side resonant coil 3 and the primary-side resonant coil 2 may, for example, be several meters. When the resonance Q is sufficiently high, the electric power can be transmitted by magnetic field resonance between the secondary-side resonant coil 3 and the primary-side resonant coil 2 even when the distance between the secondary-side resonant coil 3 and the primary-side resonant coil 2 is several meters.

Further, the secondary-side resonant coil 3 is disposed close to but not in contact with the secondary-side coil 4. The secondary-side resonant coil 3 is electromagnetically coupled with the secondary-side coil 4.

Further, as illustrated in the equivalent circuit of FIG. 2, the secondary-side resonant coil 3 may be depicted by an inductance L3 coil and a capacitor having a capacitance C3. The capacitance C3 represents the capacitance of a capacitor connected between the two ends of the secondary-side resonant coil 3 for adjusting frequencies. Although the secondary-side resonant coil 3 in practice includes a resistance component, illustration of the resistance component is omitted from FIG. 2.

The resonance frequency of the secondary-side resonant coil 3 is determined depending on the capacitance C3 and the inductance L3 of the secondary-side resonant coil 3. Hence, the capacitance C3 and the inductance L3 of the secondary-side resonant coil 3 are set such that the resonance frequency of the secondary-side resonant coil 3 is identical to the resonance frequency of the primary-side resonant coil 2 and the frequency of the AC power output from the AC power source 40.

Note that when the resonance frequency is set by the parasitic capacitance alone and the stray capacitance of the secondary-side resonant coil 3 is able to be fixed, the two ends of the secondary-side resonant coil 3 may be open.

The power receiver 20 including the secondary-side resonant coil 3 relays the electric power transmitted from the primary-side resonant coil 2 of the power transmitter 10 by magnetic field resonance to transmit the relayed electric power to the secondary-side coil 4.

As illustrated in FIG. 1, the secondary-side coil 4 is a loop-shaped coil similar to the primary-side coil 1. The secondary-side coil 4 is electromagnetically coupled with the secondary-side resonant coil 3, and the rectifier circuit 6 is connected between two ends of the secondary-side coil 4.

The secondary-side coil 4 is disposed such that the central axis of the secondary-side coil 4 matches the central axis of the secondary-side resonant coil 3. The secondary-side coil 4 is disposed close to but not in contact with the secondary-side resonant coil 3. The secondary-side coil 4 is electromagnetically coupled with the secondary-side resonant coil 3. The central axis of the secondary-side resonant coil 3 and the central axis of the secondary-side coil 4 are made to be identical to each other in order to suppress leakage of magnetic flux and to suppress unnecessary generation of magnetic fields around the secondary-side resonant coil 3 and the secondary-side coil 4 as well as improving the coupling strength between the secondary-side resonant coil 3 and the secondary-side coil 4.

Further, as illustrated in the equivalent circuit of FIG. 2, the secondary-side coil 4 may be depicted as an inductance L4 coil. Although the secondary-side coil 4 in practice includes a resistance component and a capacitor component, illustration of these components are omitted from FIG. 2.

The secondary-side coil 4 receives the electric power from the secondary-side resonant coil 3 by electromagnetic induction (mutual induction), and supplies the electric power to the rectifier circuit 6.

The rectifier circuit 6 includes four diodes 7A to 7D, and a capacitor 7E. The diodes 7A to 7D are connected in a bridge-like configuration, and rectify the full wave of the electric power input from the secondary-side coil 4 to output the full-wave rectified power. The capacitor 7E serves as a smoothing capacitor connected to the output side of the bridge circuit including the diodes 7A to 7D. The capacitor 7E smoothes the electric power on which the full-wave rectification is performed by the bridge circuit including the diodes 7A to 7D, and outputs the smoothed power as direct-current power.

The DC/DC converter 7 is connected to the output side of the rectifier circuit 6. The DC/DC converter 7 converts and outputs the voltage of the direct-current power, output from the rectifier circuit 6, into the rated voltage of the battery 50. The DC/DC converter 7 lowers the output voltage of the rectifier circuit 6 to the rated voltage of the battery 50 in a case where the output voltage of the rectifier circuit 6 is higher than the rated voltage of the battery 50. Further, the DC/DC converter 7 raises the output voltage of the rectifier circuit 6 to the rated voltage of the battery 50 in a case where the output voltage of the rectifier circuit 6 is lower than the rated voltage of the battery 50.

The power receiver 20, which includes the above-described secondary-side resonant coil 3, the secondary-side coil 4, the rectifier circuit 6, and the DC/DC converter 7, converts the AC power transmitted from the power transmitter 10 into direct-current power, and further converts the voltage of the direct-current power into the rated voltage of the battery 50.

The battery 50 may be any rechargeable secondary battery that can be repeatedly charged. For example, a lithium ion battery may be used.

For example, the primary-side coil 1, the primary-side resonant coil 2, the secondary-side resonant coil 3, and the secondary-side coil 4 may be made by winding a copper wire. However, materials for the primary-side coil 1, the primary-side resonant coil 2, the secondary-side resonant coil 3, and the secondary-side coil 4 may be metal other than copper (e.g., gold, aluminum, etc.). Further, materials of the primary-side coil 1, the primary-side resonant coil 2, the secondary-side resonant coil 3, and the secondary-side coil 4 may be different from one another.

In the above-described charging system 30, the primary-side coil 1 and the primary-side resonant coil 2 correspond to a power transmitting side, and the secondary-side resonant coil 3 and the secondary-side coil 4 correspond to a power receiving side.

The charging system 30 is a magnetic field resonance system that utilizes magnetic field resonance, generated between the primary-side resonant coil 2 and the secondary-side resonant coil 3, to transmit electric power from the power transmitting side to the power receiving side Hence, the charging system 30 can transmit the electric power over a longer distance than that of the electromagnetic induction system that transmits electric power with electromagnetic induction from the power transmitting side to the power receiving side.

As described above, in comparison with the electromagnetic induction system, the magnetic field resonance system has an advantage of handling a position gap between the primary-side resonant coil 2 (coil on the power transmitting side) and the secondary-side resonant coil 3 (coil on the power receiving side). Hence, the magnetic field resonance system is more flexible than the electromagnetic induction system with respect to the position gap or the distance between the resonant coils. The magnetic field resonance system thus has an advantage called "free-positioning".

Thus, in the first embodiment, a case where the primary-side resonant coil 2 moves relative to the secondary-side resonant coil 3 is described.

Figure 3:
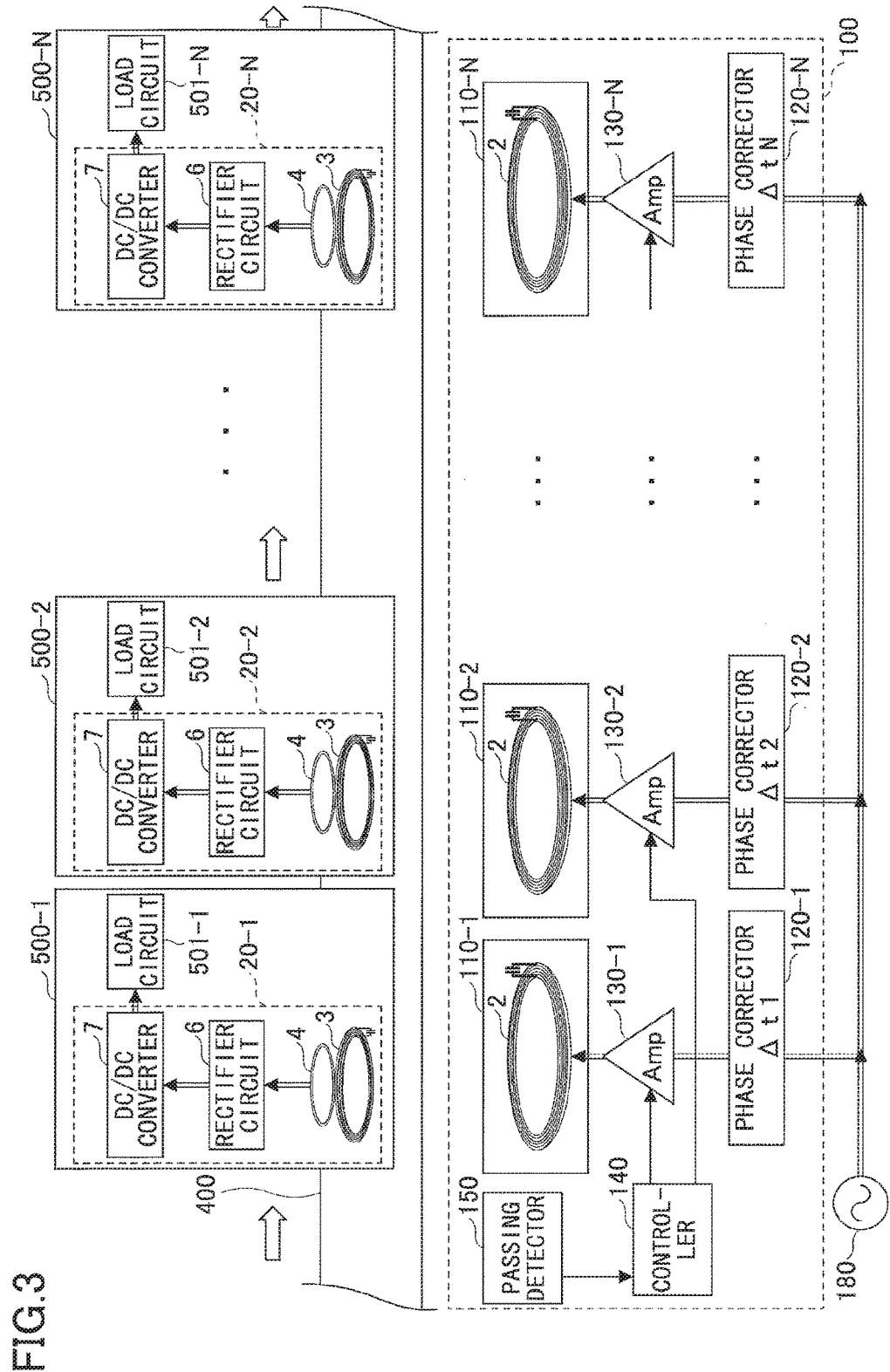
FIG. 3 is a diagram illustrating a power transmitting system using a power transmitting apparatus according to a first embodiment.

FIG. 3 is a diagram illustrating a power transmitting system using the power transmitting apparatus 100 of the first embodiment.

The power transmitting apparatus 100 includes power transmitters 110-1, 110-2 . . . and 110-N, phase correctors 120-1, 120-2 . . . and 120-N, amplifiers 130-1, 130-2 . . . and 130-N, a controller 140, and a passing detector 150. Here, N is an integer number equal to or greater than 2. For example, N may be 15. Further, a signal generator 180 is connected to the power transmitting apparatus 100.

The power transmitter 110-1, 110-2 . . . and 110-N, the phase correctors 120-1, 120-2 . . . and 120-N, and the amplifiers 130-1, 130-2 . . . and 130-N are provided for N pieces.

Further, the power transmitting apparatus 100 is disposed under a conveying belt 400. For example, the conveying belt 400 is installed inside of a factory and conveys notebook personal computers (PCs) 500-1, 500-2 . . . and 500-N.

A zone where the power transmitting apparatus 100 is disposed below the conveying belt 400 illustrated in FIG. 3 is a zone (power transmitting zone) for transmitting the electric power by magnetic field resonance from the power transmitting apparatus 100 to the PCs 500-1, 500-2 . . . and 500-N. The power transmitting zone is provided in order to charge batteries of the PCs 500-1, 500-2 . . . and 500-N.

The PCs 500-1, 500-2 . . . and 500-N are conveyed on the conveying belt 400 at constant intervals and pass the power transmitting zone at a predetermined speed without stopping. The PCs 500-1, 500-2 . . . and 500-N are loaded on the conveying belt 400 at intervals equal to intervals at which the power transmitters 110-1, 110-2 . . . and 110-N are disposed and are conveyed one after another. N PCs 500-1 to 500-N are always conveyed in the power transmitting zone.

In the following, the power transmitters 110-1, 110-2 . . . and 110-N are referred to as the power transmitters 110-1 to 110-N. Further, in a case where the power transmitters 110-1 to 110-N are not discriminated in particular, it is referred to as the power transmitter(s) 110.

Similarly, the phase correctors 120-1, 120-2 . . . and 120-N are referred to as the phase correctors 120-1 to 120-N, and the amplifiers 130-1, 130-2 . . . and 130-N are referred to as the amplifiers 130-1 to 130-N. Further, in a case where the phase correctors 120-1 to 120-N are not discriminated in particular, it is referred to as the phase corrector(s) 120, and in a case where the amplifiers 130-1 to 130-N are not discriminated in particular, it is referred to as the amplifier(s) 130.

Further, the PCs 500-1, 500-2 . . . and 500-N are referred to as the PCs 500-1 to 500-N. In a case where the PCs 500-1 to 500-N are not discriminated in particular, it is referred to as the PC(s) 500.

The power transmitters 110-1 to 110-N are connected to the signal generator 180 via the phase correctors 120-1 to 120-N and the amplifiers 130-1 to 130-N, respectively.

As described above, the power transmitters 110-1 to 110-N are disposed at the intervals equal to the intervals when the PCs 500-1 to 500N are conveyed.

In FIG. 3, only the primary-side resonant coils 2 are illustrated as elements of the power transmitters 110-1 to 110-N for convenience of description. However, in practice, each of the power transmitters 110-1 to 110-N has a configuration where the primary-side coil 1 is removed from the power transmitter 10 illustrated in FIGS. 1 and 2 and the primary-side resonant coil 2 is directly connected to the matching circuit 5.

The respective primary-side resonant coils 2 of the power transmitters 110-1 to 110-N are disposed so as to be parallel to a conveying surface of the conveying belt 400 (such that the central axes of the respective primary-side resonant coils 2 are vertical to the conveying surface).

Further, the matching circuits 5 (see FIGS. 1 and 2) of the power transmitters 110-1 to 110-N are connected to the amplifiers 130-1 to 130-N, respectively.

The phase correctors 120-1 to 120-N are connected between the signal generator and the amplifiers 130-1 to 130-N, respectively. Each of the phase correctors 120-1 to 120-N is an example of a phase adjuster and a phase adjusting circuit.

Distances between the signal generator 180 and the respective phase correctors 120-1 to 120-N are different. A distance between the signal generator 180 and the phase corrector 120-1 is shortest and a distance between the signal generator 180 and the phase corrector 120-N is longest.

In order to make uniform and output phases of AC signals input from the signal generator 180, the phase correctors 120-1 to 120-N give delay times $\Delta t1$ to $\Delta tN$, respectively.

In the delay times $\Delta t1$ to $\Delta tN$, the delay time becomes shorter in order. The delay time $\Delta t1$ is longest, and the delay time $\Delta tN$ is shortest. The delay times $\Delta t1$ to $\Delta tN$ are set such that times for transmitting the electric power from the signal generator 180 to the amplifiers 130-1 to 130-N via the phase correctors 120-1 to 120-N are identical to one another. Note that the delay times $\Delta t1$, $\Delta t2$ . . . and $\Delta tN$ are set supposing that a transmission speed of the electric power between the phase correctors 120-1 to 120-N and the signal generator 180 is 0.6 times of the light speed C, for example.

In this way, the AC signals having uniform phases (matched phases) are output from the phase correctors 120-1 to 120-N.

The amplifiers 130-1 to 130-N are connected between the phase correctors 120-1 to 120-N and the power transmitters 110-1 to 110-N, respectively. The respective amplifiers 130-1 to 130-N amplify the electric power whose phases are corrected by the phase correctors 120-1 to 120-N with predetermined amplification factors, and output the amplified electric power.

The controller 140 controls amplification factors in the amplifiers 130-1 to 130-N in accordance with a detection result of the passing detector 150. For example, the controller 140 may be realized by a microcomputer including an internal memory. The controller 140 stores, in the internal memory, control data for controlling the amplification factors of the amplifiers 130-1 to 130-N. The controller 140 controls the amplification factors in the amplifiers 130-1 to 130-N in accordance with the detection result of the passing detector 150. The control of the amplification factor by the controller 140 will be described later.

The passing detector 150 is disposed at a location located upstream from the power transmitter 110-1 by a predetermined distance in the conveyance direction of the conveying belt 400. The passing detector 150 detects passing of the PCs 500-1 to 500N. For example, the passing detector 150 may be a sensor that can detect passing of goods such as an infrared sensor. The passing detector 150 is an example of a passing detector.

The passing detector 150 outputs, to the controller 140, a signal representing the detection result. When the passing detector 150 detects passing of the PCs 500-1 to 500-N, the passing detector 150 outputs the signal representing the passing of the PCs 500-1 to 500-N.

In the first embodiment, the PCs 500-1 to 500-N are conveyed in a state where the PCs 500-1 to 500-N are arranged, on the conveying belt 400, at intervals equal to the intervals at which the power transmitters 110-1 to 110-N are arranged. In the first embodiment, a moving speed of the conveying belt 400 is constant.

Accordingly, when passing of the forehand PC 500-1 is detected by the passing detector 150, timing when the PCs 500-1 to 500-N pass the power transmitters 110-1 to 110-N can be detected based on a distance from the passing detector 150 to the power transmitter 110-1, intervals between the power transmitters 110-1 to 110-N, and the moving speed of the conveying belt 400.

Further, when passing of the forehand PC 500-1 is detected by the passing detector 150, positions of the PCs 500-1 to 500-N relative to the power transmitters 110-1 to 110-N can be detected. Thus, the passing detector 150 is an example of a position detector.

Output terminals of the signal generator 180 are connected to input terminals of the phase correctors 120-1 to 120-N. The signal generator 180 outputs, to the phase correctors 120-1 to 120-N, the AC signals that are sources of the AC power transmitted from the power transmitter 110-1 to 110-N.

The signal generator 180 is an example of an alternating-current source. The signal generator 180 may be a circuit that can generate the AC signals equal to the resonance frequency of the resonance by magnetic field resonance generated between the primary-side resonant coil 2 and the secondary-side resonant coil 3.

Note that the resonance frequency is set to a predetermined frequency in advance. Here, the resonance frequency is 6.78 MHz, for example. Allocation of such a resonant frequency used for the magnetic-field resonance is determined by law or the like. Accordingly, the frequency of the AC signals that the signal generator 180 outputs may be set in accordance with the resonance frequency used for the magnetic-field resonance.

The conveying belt 400 is provided on a downstream side of a line for performing an operation confirmation test of the PCs 500. The conveying belt 400 is a belt shaped conveying apparatus that conveys only PCs 500 that pass the operation confirmation test. The conveying belt 400 is an example of a conveyance path.

FIG. 3 illustrates a state where the PCs 500-1 to 500-N, which have passed the operation confirmation test, are conveyed by the conveying belt 400. The conveying belt 400 conveys the PCs 500-1 to 500-N from left to right (direction of arrow) in FIG. 3.

The PCs 500-1 to 500-N include power receivers 20-1 to 20-N and load circuits 501-1 to 501-N, respectively. In the following, in a case where the power receivers 20-1 to 20-N and the load circuits 501 to 501-N are not discriminated, they are referred to as the power receiver(s) 20 and the load circuit(s) 501, respectively.

Each of the power receivers 20-1 to 20-N is similar to the power receiver 20 illustrated in FIGS. 1 and 2 and includes the secondary-side resonant coil 3, the secondary-side coil 4, the rectifier circuit 6, and the DC/DC converter 7. The respective secondary-side resonant coils 3 of the power receivers 20-1 to 20-N are disposed so as to be parallel to the conveying surface of the conveying belt 400 (such that the central axes of the respective secondary-side resonant coils 3 are vertical to the conveying surface) in a state where the PCs 500-1 to 500-N are loaded on the conveying belt 400. Thus, in the state where the PCs 500-1 to 500-N are loaded on the conveying belt 400, the central axes of the respective secondary-side resonant coils 3 match the central axes of the primary-side resonant coils 2.

The load circuits 501-1 to 501-N are batteries, auxiliary storage devices such as hard disk drives, main storage devices such as cache memories, Central Processing Units (CPU) of the PCs 500-1 to 500-N and the like.

The power receivers 20-1 to 20-N of the PCs 500-1 to 500-N receive the electric power from the power transmitters 110-1 to 110-N while being conveyed by the conveying belt 400. In this way, the batteries of the PCs 500-1 to 500-N are charged.

The power transmitting apparatus 100 gives, to the AC signals input to the phase correctors 120-1 to 120-N from the signal generator 180, the delay times $\Delta t1$ to $\Delta tN$ to correct the phases, and inputs the AC signals having the corrected phases to the amplifiers 130-1 to 130-N, respectively.

The amplifiers 130-1 to 130-N amplify the respective AC signals having the corrected phases to make the AC power. The AC power is transmitted by the magnetic field resonance from the respective power transmitters 110-1 to 110-N to the power receivers 20-1 to 20-N of the PCs 500-1 to 500-N. In this way, the batteries of the PCs 500-1 to 500-N are charged.

Here, the power transmitting system according to the first embodiment is a system that includes the power transmitting apparatus 100 and the signal generator 180.

Figure 4:
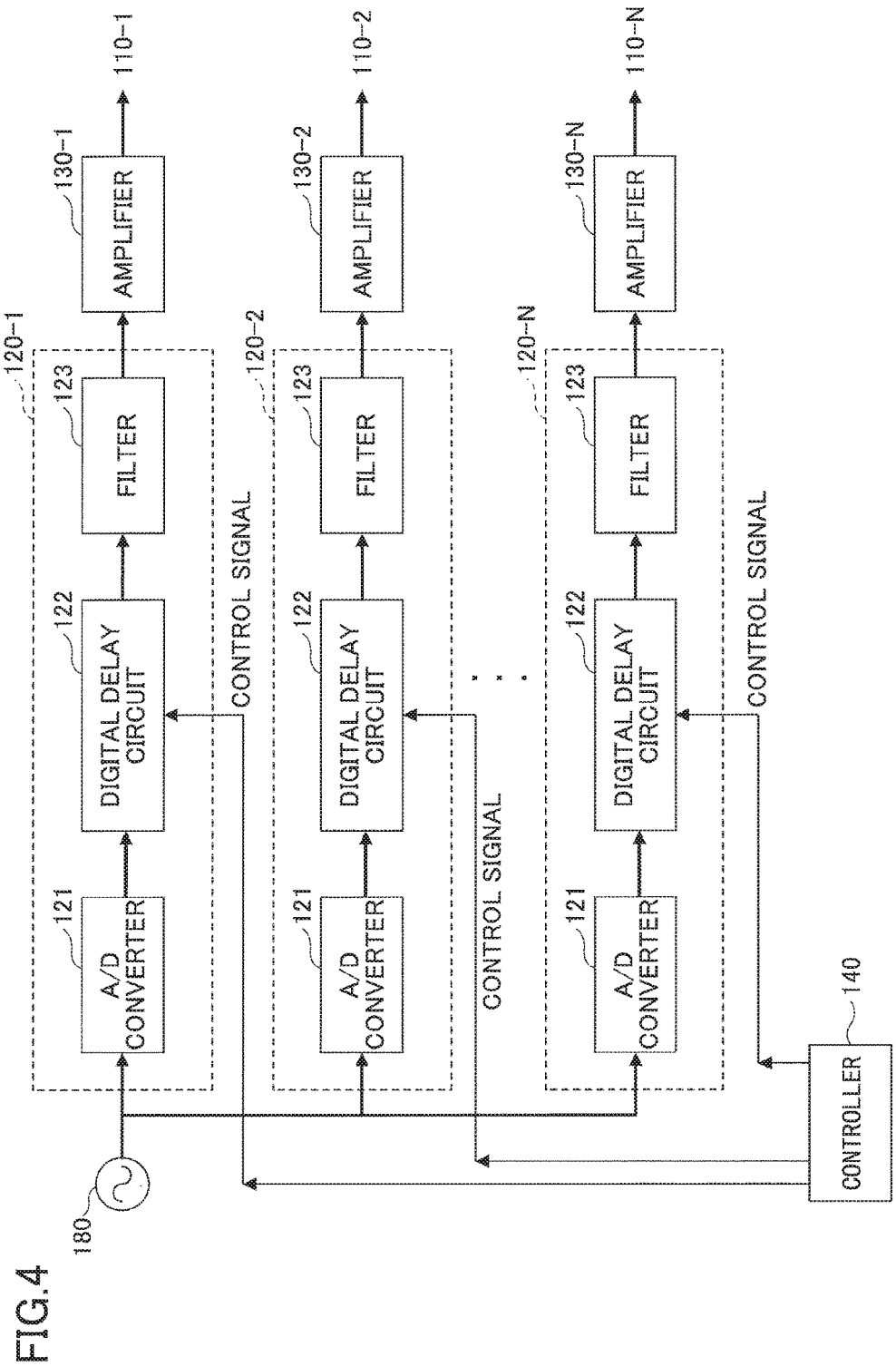
FIG. 4 is a diagram illustrating configurations of phase correctors of the power transmitting apparatus of the first embodiment.

FIG. 4 is a diagram illustrating configurations of the phase correctors 120-1 to 120-N of the power transmitting apparatus 100 of the first embodiment. FIG. 4 illustrates the controller 140 and the signal generator 180 in addition to the phase correctors 120-1 to 120-N.

Because the phase correctors 120-1 to 120-N have similar configurations, the phase corrector 120-1 is described here.

The phase corrector 120-1 includes an A/D converter 121, a digital delay circuit 122, and a filter 123.

The input terminal of the A/D converter 121 is connected to the output terminal of the signal generator 180. The output terminal of the A/D converter 121 is connected to the input terminal of the digital delay circuit 122. The A/D converter 121 converts the AC signal (analog signal) output from the signal generator 180 into a digital signal to output the digital signal to the digital delay circuit 122.

The input terminal of the digital delay circuit 122 is connected to the output terminal of the A/D converter 121. The output terminal of the digital delay circuit 122 is connected to the input terminal of the filter 123. Further, a control signal is input to the digital delay circuit 122 from the controller 140.

The control signals input to the digital delay circuits 122 of the phase correctors 120-1 to 120-N from the controller 140 are count values for realizing the above described delay times $\Delta t1$ to $\Delta tN$, respectively. The controller 140 generates the control signals representing the count values corresponding to the respective delay times $\Delta t1$ to $\Delta tN$ based on a system clock, and outputs the control signals to the digital delay circuits 122 of the phase correctors 120-1 to 120-N.

The digital delay circuit 122 gives, to the AC signal (digital value) input from the A/D converter 121, the delay time based on the control signal input from the controller 140. The digital delay circuit 122 outputs the delayed AC signal (digital value) to the filter 123. For example, Delay Locked Loop (DLL) may be used as such a digital delay circuit 122.

The input terminal of the filter 123 is connected to the output terminal of the digital delay circuit 122. The output terminal of the filter 123 is connected to the input terminal of the amplifier 130. The filter 123 filters out the noise from the AC signal (digital value) output from the digital delay circuit 122 and outputs, to the amplifier 130, the AC signal converted into the analog value.

As described above, the respective phase correctors 120-1 to 120-N delay the AC signals, input from the signal generator 180, to output the AC signals to the amplifiers 130-1 to 130-N. The phases of the N AC signals output from the phase correctors 120-1 to 120-N are identical one another.

Thus, all phases of the electric power transmitted from the power transmitters 110-1 to 110-N are consistent. Because the electric power that the respective power transmitters 110-1 to 110-N output toward the power receivers 20-1 to 20-N influences each other, power receiving efficiency in the power receivers 20-1 to 20-N decreases when the phases are different. Thus, the phases of the electric power transmitted from the power transmitters 110-1 to 110-N are matched as described above.

Here, electric power received by the power receivers 20-1 to 20-N (received electric power) is described with reference to FIG. 5 which is received in a case where the phases of the AC signals are not made uniform by the phase correctors 120-1 to 120-N and the AC signals having different phases are output from the power transmitters 110-1 to 110-N.

Here, differences in length of N transmission channels to the respective power transmitters 110-1 to 110-N from the signal generator 180 are equal.

Here, a phase difference of electric power transmitted by two adjacent power transmitters 110 is α among the power transmitters 110-1 to 110-N. Further, FIG. 5 also illustrates an influence due to a position gap of the power receivers 20-1 to 20-N relative to the power transmitters 110-1 to 110-N.

The position gap of the power receivers 20-1 to 20-N relative to the power transmitters 110-1 to 110-N mean a position gap of the secondary-side resonant coils 3 of the power receivers 20-1 to 20-N included in the PCs 500-1 to 500-N relative to the primary-side resonant coils 2 of the power transmitters 110-1 to 110-N.

Figure 5:
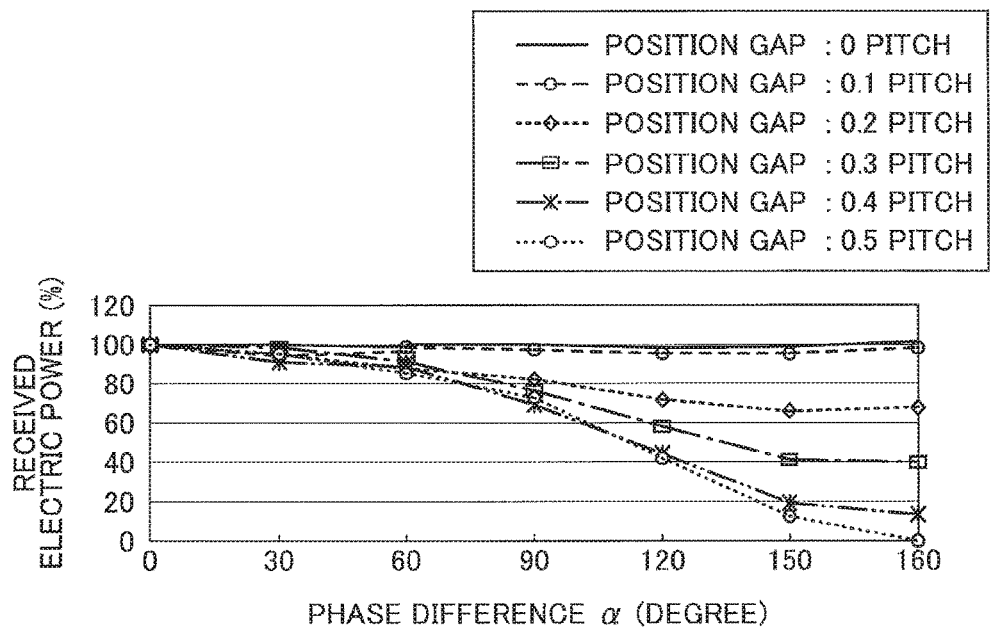
FIG. 5 is a diagram illustrating a relationship between a phase difference $\alpha$ of electric power and received electric power.

FIG. 5 is a diagram illustrating a relationship between the phase difference α of the electric power and the received electric power. The received electric power is expressed with proportion (%) of the received electric power to transmitted electric power. Further, FIG. 5 illustrates characteristics of the received electric power with respect to the phase difference α of the electric power in a case where the position gap of the power receivers 20-1 to 20-N relative to the power transmitters 110-1 to 110-N changes from 0 pitch to 0.5 pitch.

Here, 1 pitch is an interval between the adjacent power transmitters 110 of the power transmitters 110-1 to 110-N. Thus, in a case where the position gap is 0 pitch, there is no position gap of the power receivers 20-1 to 20-N relative to the power transmitters 110-1 to 110-N and the central axes of the power transmitters 110-1 to 110-N and the central axes of the power receivers 20-1 to 20-N are identical one another.

Further, in a case where the position gap is 0.5 pitch, the central axes of the power receivers 20-1 to 20-N are present at centers between the adjacent power transmitters 110 of the power transmitters 110-1 to 110-N. In a case where the position gap is 0.5 pitch, the position gap of the power receivers 20-1 to 20-N relative to the power transmitters 110-1 to 110-N is maximum.

Further, in the magnetic field resonance system, the power receivers 20-1 to 20-N receive the electric power even when the positions of the power receivers 20-1 to 20-N are misaligned relative to the power transmitters 110-1 to 110-N. Thus, a first power receiver 20 receives the electric power from a second power transmitter 110 adjacent to a first power transmitter 110 corresponding to the first power receiver 20 in addition to receiving the electric power from the first power transmitter 110. Further, the first power receiver 20 receives the electric power from a power transmitter 110 adjacent to the second power transmitter 110.

Accordingly, in consideration that each of the power receivers 20-1 to 20-N receives the electric power from the plurality of power transmitters 110 as described above, an amount of the transmitted electric power from each of the power transmitters 110-1 to 110-N is set to a reference value such that each of the power receivers 20-1 to 20-N can receive an appropriate amount of the electric power.

FIG. 5 illustrates the received electric power with respect to such a reference value of the transmitted electric power in percent figures.

The characteristics illustrated in FIG. 5 are obtained by an electromagnetic field simulation under the following conditions. A wire diameter of the primary-side resonant coil 2 and a wire diameter of the secondary-side resonant coil 3 are 1 mm, and the resonance frequency of the resonance according to the magnetic field resonance that occurs between the primary-side resonant coil 2 and the secondary-side resonant coil 3 is set to 6.78 MHz. Further, a power transmission distance for transmitting the electric power between the primary-side resonant coil 2 and the secondary-side resonant coil 3 is 50 mm in a state where the central axis of the primary-side resonant coil 2 and the central axis of the secondary-side resonant coil 3 are identical.

Further, a spirally wound coil having a rectangular shape in plan view is used as the primary-side resonant coil 2. A longitudinal outer length of the rectangle is 60 mm and a lateral outer length of the rectangle is 990 mm. The coil wound 5 times planarly is used as the primary-side resonant coil 2 so as to fit the coil into such a rectangle. Further, coil pitches between the adjacent primary-side resonant coils 2 are 1000 mm (between centers), and the primary-side resonant coils 2 are laterally arranged at intervals of 10 mm between the adjacent primary-side resonant coils 2.

A spirally wound coil having a rectangular shape in plan view is used as the secondary-side resonant coil 3. A longitudinal outer length of the rectangle is 60 mm and a lateral outer length of the rectangle is 900 mm. The coil wound 5 times planarly is used as the secondary-side resonant coil 3 so as to fit the coil into such a rectangle. Further, a spirally wound coil having a rectangular shape in plan view is used as the secondary-side coil 4. A longitudinal outer length of the rectangle is 60 mm and a lateral outer length of the rectangle is 900 mm. The coil wound 2 times planarly is used as the secondary-side coil 4 so as to fit the coil into such a rectangle.

Although the coils each having the rectangular shape in plan view are used as the primary-side resonant coils 2, the secondary-side resonant coils 3, and the secondary-side coils 4 in the simulation as described above, these coils may be coils wound in various shapes such as a circular shape or a square shape.

As illustrated in FIG. 5, a value of the received electric power in a case where the position gap is 0 pitch and the phase difference α is 0 degrees is expressed in percentage figures (%). Here, 100% expresses the value of the above described received electric power. When the phase difference α changes from 0 degrees to 180 degrees, the received electric power decreases in some degree but the value of the received electric power is equal to or greater than about 95% as illustrated. Thus, it is proved that the increase of the phase difference α has a small influence on the received electric power if the position gap does not occur.

Further, in a case where the phase difference α is 0 degrees, the received electric power does not change substantially even when the position gap increases from 0.1 pitch to 0.5 pitch. However, when the phase difference α changes from 0 degrees to 180 degrees, the received electric power decreases. As illustrated in FIG. 5, the received electric power decreases in accordance with increasing of the phase difference α as the position gap becomes large. In particular, in a case where the position gap is 0.5 pitch and the phase difference α is 180 degrees, the received electric power is almost 0%. Thus, it is proved that the received electric power decreases in accordance with the increase of the phase difference α when there is the position gap.

Further, as described, because the differences in length of N transmission channels to the respective power transmitters 110-1 to 110-N from the signal generator 180 are equal, a phase difference becomes 2α between a phase of transmitted electric power of a certain power transmitter 110 and a phase of transmitted electric power of a power transmitter 110 adjacent to a power transmitter 110 that is adjacent to the certain power transmitter 110.

Accordingly, when the phases of the transmitted electric power of the respective power transmitters 110-1 to 110-N are different, the received electric power in each of the power receivers 20-1 to 20-N decreases.

Figure 6:
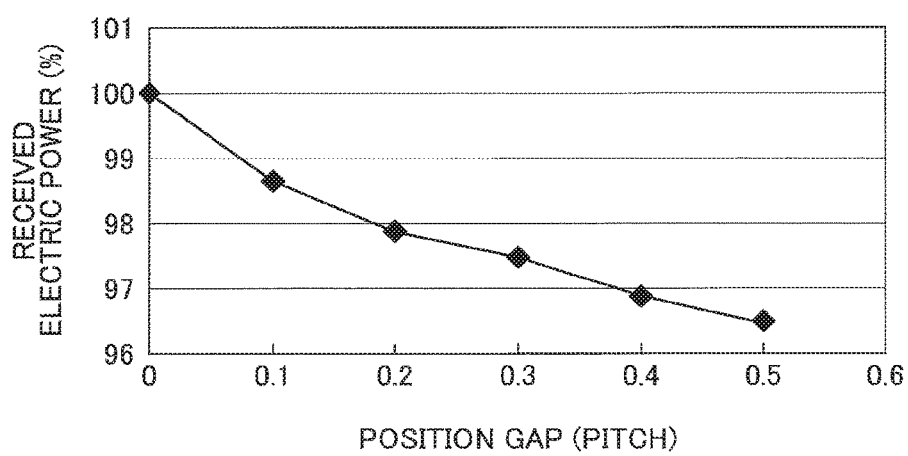
FIG. 6 is a diagram illustrating characteristics of the received electric power with respect to a position gap in a case where the phase difference $\alpha$ of the electric power is 0 degrees.

FIG. 6 is a diagram illustrating characteristics of the received electric power with respect to the position gap in a case where the phase difference α of the electric power is 0 degrees. That is, the characteristics illustrated in FIG. 6 are obtained by extracting received electric power when the position gap changes from 0 pitch to 0.5 pitch in a case where the phase difference α illustrated in FIG. 5 is 0 degrees.

As illustrated in FIG. 6, in a case where the phase difference α is 0 degrees, the received electric power decreases in accordance with the change of the position gap. The received electric power is about 100% when the position gap is 0 pitch. The received electric power is about 96.5% when the position gap is 0.5 pitch.

In this way, it is proved that the received electric power decreases by about 3.5% due to the position gap even when the phase difference α is set to 0 degrees.

Accordingly, first, the power transmitting apparatus 100 of the first embodiment causes the phase correctors 120-1 to 120-N to delay the AC signals input from the signal generator 180 to match all phases of the electric power transmitted from the power transmitters 110-1 to 110-N, respectively.

That is, the power transmitting apparatus 100 sets the delay times Δt1 to ΔtN given by the phase correctors 120-1 to 120-N to the AC signals input from the signal generator 180 such that the phase differences of the electric power transmitted from the power transmitters 110-1 to 110-N become zero degrees.

Further, in addition to the above described adjustment of the phases, the power transmitting apparatus 100 adjusts the electric power transmitted from the primary-side resonant coils 2 of the power transmitters 110-1 to 110-N in accordance with the position gap between the secondary-side resonant coils 3 of the power receivers 20-1 to 20-N included in the PCs 500-1 to 500-N and the primary-side resonant coils 2 of the power transmitters 110-1 to 110-N.

The position gap between the secondary-side resonant coils 3 of the power receivers 20-1 to 20-N included in the PCs 500-1 to 500-N and the primary-side resonant coils 2 of the power transmitters 110-1 to 110-N can be detected by the passing detector 150 detecting passing of the PC 500-1.

As described above, the timing when the PCs 500-1 to 500-N pass the power transmitters 110-1 to 110-N can be detected based on the distance from the passing detector 150 to the power transmitter 110-1, the intervals between the power transmitters 110-1 to 110-N, and the moving speed of the conveying belt 400. Further, the PCs 500-1 to 500-N are arranged at intervals equal to those of the power transmitters 110-1 to 110-N in the conveying direction by the conveying belt 400.

Accordingly, when the passing of the forehand PC 500-1 is detected by the passing detector 150, it becomes possible to detect the position gap between the secondary-side resonant coils 3 of the power receivers 20-1 to 20-N included in the PCs 500-1 to 500-N and the primary-side resonant coils 2 of the power transmitters 110-1 to 110-N.

Further, adjustment of the electric power transmitted from the primary-side resonant coils 2 of the power transmitters 110-1 to 110-N is realized by the controller 140 controlling the amplification factors of the amplifiers 130-1 to 130-N. Specifically, the controller 140 corrects the amplification factors of the amplifiers 130-1 to 130-N based on the characteristics illustrated in FIG. 7 to control the amplification factors of the amplifiers 130-1 to 130-N.

Figure 7:
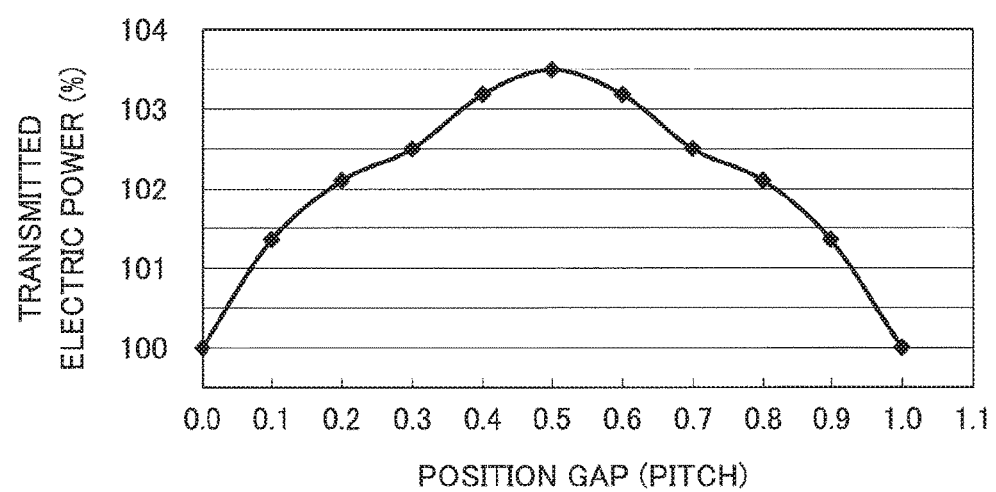
FIG. 7 is a diagram illustrating characteristics of transmitted electric power with respect to the position gap in the power transmitting apparatus of the first embodiment.

FIG. 7 is a diagram illustrating characteristics of the transmitted electric power with respect to the position gap in the power transmitting apparatus 100 of the first embodiment. The characteristics illustrated in FIG. 7 are the control data stored in the internal memory of the controller 140. The control data are used to control the amplification factors of the amplifiers 130-1 to 130-N.

Here, the position gap is a position gap of the power receivers 20-1 to 20-N relative to the power transmitters 110-1 to 110-N. Further, the transmitted electric power illustrated in FIG. 7 expresses the electric power transmitted from the power transmitters 110-1 to 110-N in percentage figures (%). Here, 100% expresses the above described reference value of the transmitted electric power.

As illustrated in FIG. 7, the transmitted electric power is set to 100% in a case where the position gap is 0 pitch. The reference value (100%) is enough for the transmitted electric power in a case where the position gap does not occur.

The transmitted electric power is set to gradually increase in accordance with the increase of the position gap. The transmitted electric power is set to be about 103.5% in a case where the position gap is 0.5 pitch. Further, when the position gap is larger than 0.5 pitch, the transmitted electric power is set to gradually decrease. The transmitted electric power is set to return to 100% in a case where the position gap is 1.0 pitch.

As described above, 0.5 pitch is the largest position gap. The position gap of 0 pitch is equivalent to the position gap of 1.0 pitch. Accordingly, the transmitted electric power becomes maximum when the position gap is 0.5 pitch and the characteristics illustrated in FIG. 7 have laterally symmetric characteristics about 0.5 pitch.

Such characteristics can be calculated as inverse characteristics of the characteristics illustrated in FIG. 6. Thus, the maximum value of the transmitted electric power illustrated in FIG. 7 is about 103.5%. This corresponds to decreasing of the received electric power about 3.5% due to the position gap as illustrated in FIG. 6.

Accordingly, the controller 140 of the power transmitting apparatus 100 of the first embodiment controls the amplification factors of the amplifiers 130-1 to 130-N in order to change the electric power transmitted from the power transmitters 110-1 to 110-N corresponding to the position gap as the characteristics illustrated in FIG. 7.

As described above, the position gap between the primary-side resonant coils 2 of the power transmitters 110-1 to 110-N and the secondary-side resonant coils 3 of the power receivers 20-1 to 20-N included in the PCs 500-1 to 500-N can be detected by detecting the passing of the PC 500-1 with the passing detector 150.

Accordingly, when the controller 140 uses the characteristics illustrated in FIG. 7 to correct the amplification factors of the amplifiers 130-1 to 130-N based on a result of detecting the passing of the PC 500-1 detected by the passing detector 150, it becomes possible to correct the decrease of the received electric power in the power receivers 20-1 to 20-N due to the position gap.

As described above, according to the first embodiment, it becomes possible to provide the power transmitting apparatus 100 that can effectively transmit the electric power to the plurality of power receivers 20-1 to 20-N.

Further, the power transmitting apparatus 100 of the first embodiment can effectively transmit, from the plurality of power transmitters 110, the AC power based on the AC signals that the single signal generator 180 generates. Accordingly, the apparatus configuration can be simplified because the power transmitting apparatus 100 does not have to have the AC power source for each of the plurality of power transmitters 110.

Although the above described embodiment has the configuration where the power transmitter 110 does not include the primary-side coil 1 and the primary-side resonant coil 2 is directly connected to the matching circuit 5, the power transmitters 110 may include the primary-side coils 1.

Second Embodiment

Figure 8:
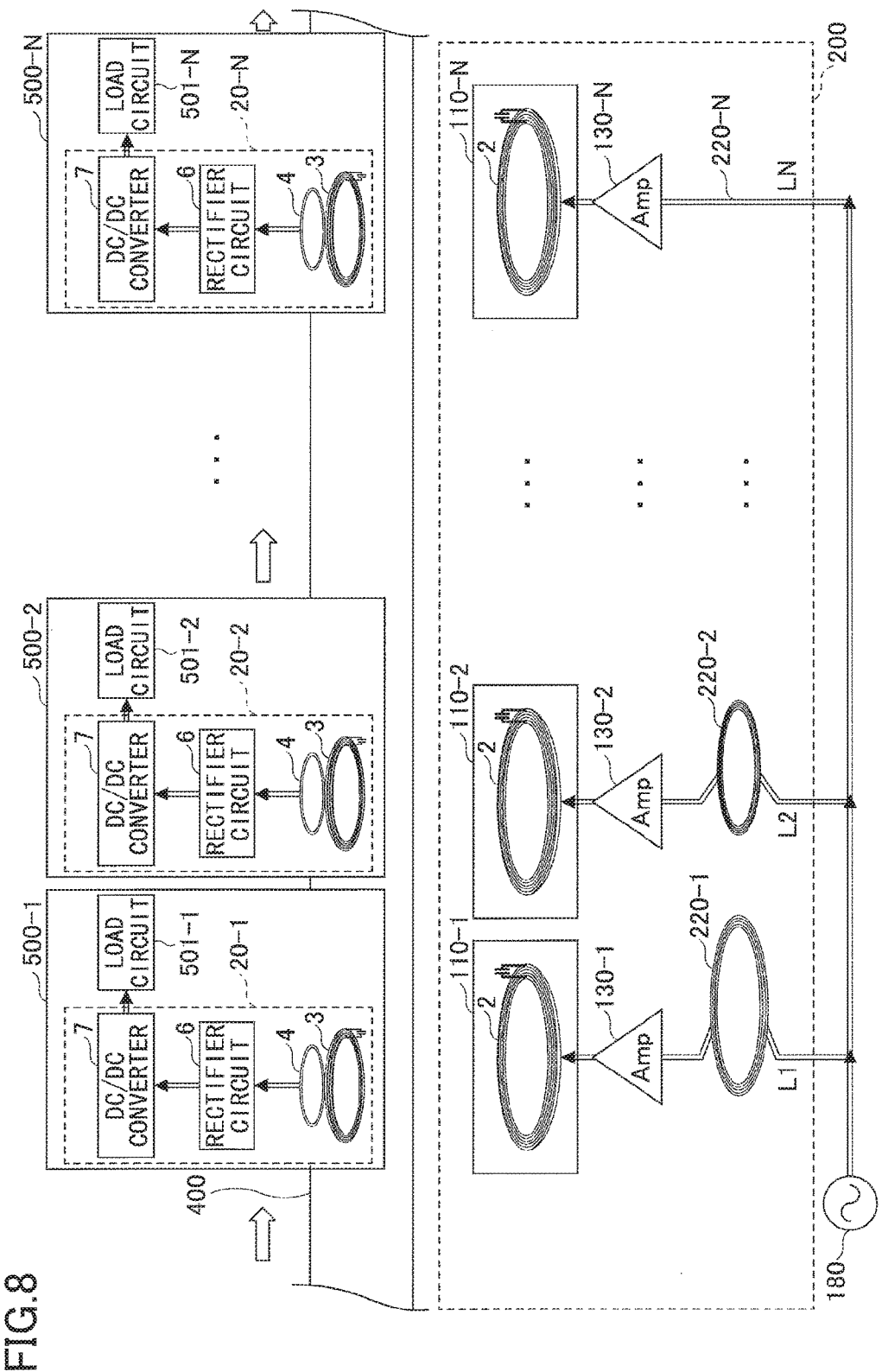
FIG. 8 is a diagram illustrating a power transmitting system that uses a power transmitting apparatus according to a second embodiment.

FIG. 8 is a diagram illustrating a power transmitting system that uses a power transmitting apparatus 200 according to a second embodiment.

In the power transmitting apparatus 200, the phase correctors 120-1 to 120-N of the power transmitting apparatus 100 (see FIG. 3) of the first embodiment are replaced with cables 220-1 to 220-N, and the controller 140 and the passing detector 150 (see FIG. 3) are removed. Other configurations of the power transmitting apparatus 200 are similar to those of the power transmitting apparatus 100 of the first embodiment. Thus, same reference numerals are given to the similar elements and their descriptions are omitted.

In the power transmitting apparatus 200 of the second embodiment, the position gap of the power receivers 20-1 to 20-N relative to the power transmitters 110-1 to 110-N is not considered. Thus, the power transmitting apparatus 200 of the second embodiment has a configuration where the controller 140 and the passing detector 150 (see FIG. 3) are removed.

A variation of the received electric power with respect to the position gap is less than about 3.5% as described in the first embodiment with reference to FIG. 6. It is known that the received electric power decreases to about 0% in a case where the phases of the AC signals of are not made uniform by the phase correctors 120-1 to 120-N and the AC signals having different phases are output from the power transmitters 110-1 to 110-N (see FIG. 5).

That is, the correction of the transmitted electric power for the position gap, which the controller 140 of the first embodiment performs, has a smaller influence on the received electric power of the power receivers 20-1 to 20-N than that of using the phase correctors 120-1 to 120-N to make uniform the phases of the transmitted electric power of the power transmitters 120-1 to 120-N.

Thus, in the second embodiment, only alignment of the phases of the electric power of the power transmitters 110-1 to 110-N is performed. Further, the power transmitting apparatus 200 of the second embodiment uses the cables 220-1 to 220-N to make uniform the phases of the AC signals instead of the phase correctors 120-1 to 120-N of the first embodiment.

The cables 220-1 to 220-N connect between output terminals of the signal generator 180 and the input terminals of the amplifiers 130-1 to 130-N, respectively. Here, the amplification factors of the amplifiers 130-1 to 130-N are constant in the second embodiment.

Surplus lengths L1 to LN of the cables 220-1 to 220-N are set such that the lengths between the output terminals of the signal generator 180 and the input terminals of the amplifiers 130-1 to 130-N are equal, respectively. The cables 220-1 to 220-N are an example of phase adjusters and transmission channels.

The amplifier 130-1 is closest to the signal generator 180 and the amplifier 130-N is farthest from the signal generator 180 among the amplifiers 130-1 to 130-N. That is, in the lengths of the transmission channels between the signal generator 180 and the amplifiers 130-1 to 130-N, the length between the amplifier 130-1 and the signal generator 180 is shortest and the length between the amplifier 130-N and the signal generator 180 is longest.

Thus, surpluses of the cables 220-1 to 220-N, that is, the lengths L1 to LN of differences from shortest connectable lengths are set such that the length L1 is longest, the length LN is shortest, and the lengths between the output terminals of the signal generator 180 and the input terminals of the amplifiers 130-1 to 130-N are equal.

According to the above described cables 220-1 to 220-N, similar to the first embodiment, it becomes possible to make uniform the phases of the transmitted electric power of the power transmitters 110-1 to 110N and to provide the power transmitting apparatus 200 that can effectively transmit the electric power to the plurality of power receivers 20-1 to 20-N.

In the above described embodiment, the length L1 is longest and the length LN is shortest in the lengths L1 to LN of the cables 220-1 to 220-N. However, for example, in a case where a wavelength λ corresponding to one cycle of the electric power in the resonance frequency is included any of the lengths L1 to LN, the cable may be shortened for the wavelength λ.

Further, in the above described embodiment, the position gap of the power receivers 20-1 to 20-N relative to the power transmitters 110-1 to 110-N is not considered and the amplification factors of the amplifiers 130-1 to 130-N are constant. However, similar to the first embodiment, the controller 140 and the passing detector 150 (see FIG. 3) may be used, and the controller 140 may use characteristics as illustrated in FIG. 7 to control the amplification factors of the amplifiers 130-1 to 130-N in accordance with the position gap.

Third Embodiment

Figure 9:
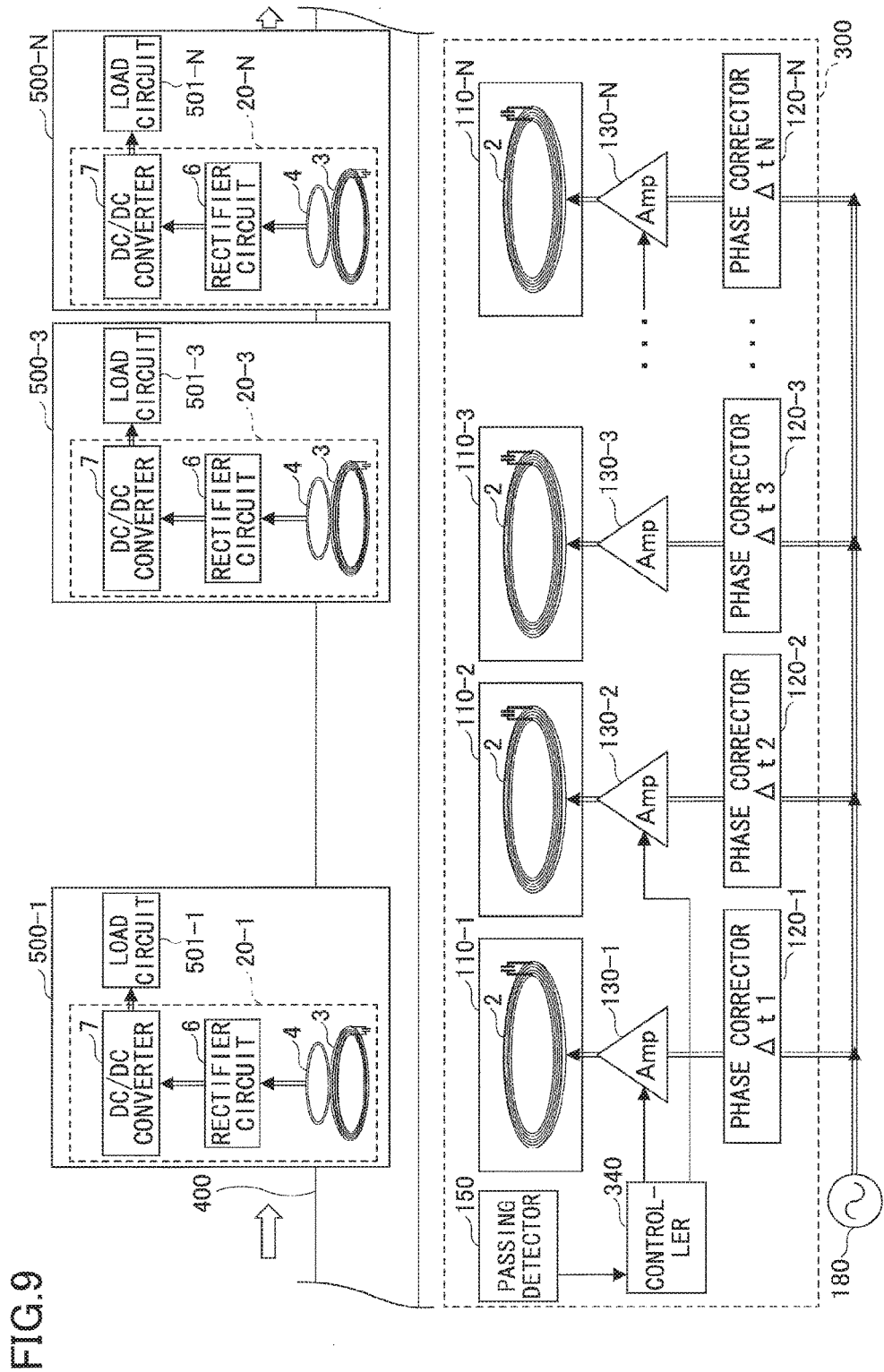
FIG. 9 is a diagram illustrating a power transmitting system that uses a power transmitting apparatus according to a third embodiment.

FIG. 9 is a diagram illustrating a power transmitting system that uses a power transmitting apparatus 300 according to a third embodiment.

The power transmitting apparatus 300 of the third embodiment relates to control of the amplification factors of the amplifiers 130-1 to 130-N in a case where at least any one of the PCs 500-1 to 500-N is missing.

The power transmitting apparatus 300 has a configuration where the controller 140 of the power transmitting apparatus 100 of the first embodiment is replaced with a controller 340. As described above, the controller 340 controls the amplification factors of the amplifiers 130-1 to 130-N in the case where at least any one of the PCs 500-1 to 500-N is missing.

In the third embodiment, a case is described as an example where the PC 500-2 of the PCs 500-1 to 500-N is missing. Further, in FIG. 9, the PC 500-3 and the power transmitter 110-3, the phase corrector 120-3, and the amplifier 130-3 are illustrated.

Here, a case is described with reference to FIG. 10 where a third PC 500 from the upstream side is missing and secondary-side resonant coils 3 included in power receivers 20 of a second PC 500 and a fourth PC 500 receive electric power, though five PCs 500 should be present in the power transmitting zone. In this case, five power transmitters 110 are disposed in the power transmitting zone.

That is, the electric power received by the secondary-side resonant coils 3 of the power receivers 20 of the second and fourth PCs 500 is described in a case where the four PCs 500 (first, second, fourth, and fifth PCs 500 from the upstream side) are present in the power transmitting zone disposed along the conveying belt 400.

Such a situation may occur, for example, in a case where only one PC 500 does not pass the operation confirmation test and is not loaded on the conveying belt 400 when the operation confirmation test is continuously performed for the plurality of PCs 500.

Figure 10:
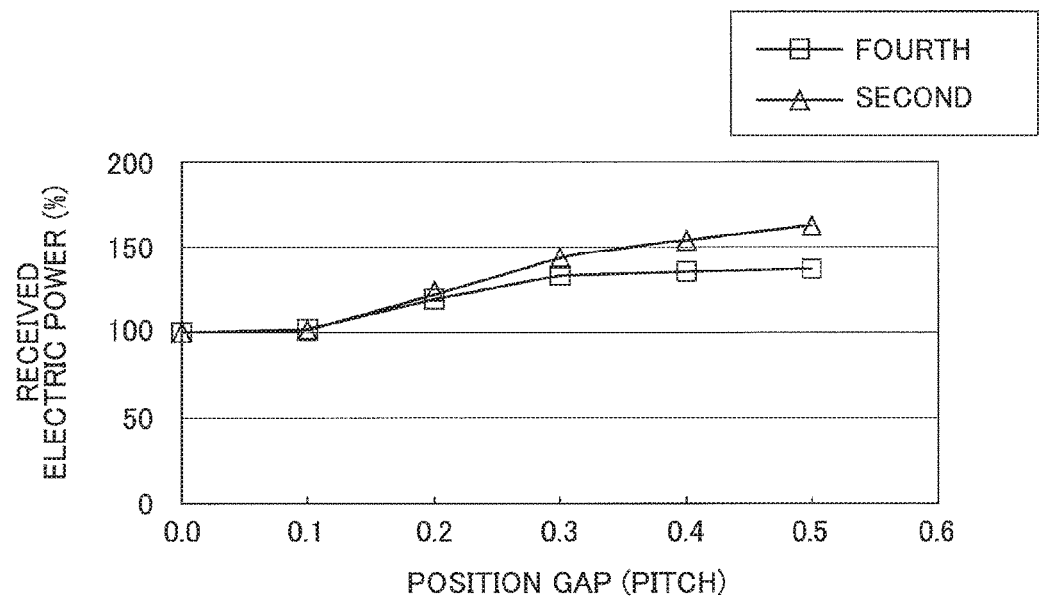
FIG. 10 is a diagram illustrating characteristics of the received electric power, with respect to the position gap, received by secondary-side resonant coils included in power receivers of second and fourth PCs from the upstream side.

FIG. 10 is a diagram illustrating characteristics of the received electric power, with respect to the position gap, received by the secondary-side resonant coils 3 included in the power receivers 20 of the second and fourth PCs 500 from the upstream side. Here, the position gap is a position gap of the secondary-side resonant coils 3 included in the power receivers 20 of the second and fourth PCs 500 from the upstream side relative to the primary-side resonant coils 2 of the second and fourth power transmitters 110 from the upstream side in the power transmitting zone. Further, similar to the position gap used in FIGS. 5 to 7, a unit of the position gap is pitch.

The characteristics illustrated in FIG. 10 are obtained by an electromagnetic field simulation under the following conditions. A wire diameter of the primary-side resonant coil 2 and a wire diameter of the secondary-side resonant coil 3 are 1 mm, and the resonance frequency of the resonance according to the magnetic field resonance that occurs between the primary-side resonant coil 2 and the secondary-side resonant coil 3 is set to 6.78 MHz. Further, a power transmission distance for transmitting the electric power between the primary-side resonant coil 2 and the secondary-side resonant coil 3 is 50 mm in a state where the central axis of the primary-side resonant coil 2 and the central axis of the secondary-side resonant coil 3 are identical.

Further, a spirally wound coil having a rectangular shape in plan view is used as the primary-side resonant coil 2. A longitudinal outer length of the rectangle is 60 mm and a lateral outer length of the rectangle is 990 mm. The coil wound 5 times planarly is used as the primary-side resonant coil 2 so as to fit the coil into such a rectangle. Further, coil pitches between the adjacent primary-side resonant coils 2 are 1000 mm (between centers), and the primary-side resonant coils 2 are laterally arranged at intervals of 10 mm between the adjacent primary-side resonant coils 2.

A spirally wound coil having a rectangular shape in plan view is used as the secondary-side resonant coil 3. A longitudinal outer length of the rectangle is 60 mm and a lateral outer length of the rectangle is 900 mm. The coil wound 5 times planarly is used as the secondary-side resonant coil 3 so as to fit the coil into such a rectangle. Further, a spirally wound coil having a rectangular shape in plan view is used as the secondary-side coil 4. A longitudinal outer length of the rectangle is 60 mm and a lateral outer length of the rectangle is 900 mm. The coil wound 2 times planarly is used as the secondary-side coil 4 so as to fit the coil into such a rectangle.

As illustrated in FIG. 10, when the third PC 500 is missing, the received electric power of the secondary-side resonant coils 3 included in the power receivers 20 of the second and fourth PCs 500 is equal to or greater than 100% and increases in accordance with increasing of the position gap.

In particular, a degree of increase, in accordance with the increase of the position gap, of the received electric power of the second secondary-side resonant coil 3 is greater than that of the fourth secondary-side resonant coil 3 because the second secondary-side resonant coil 3 becomes closer to the third primary-side resonant coil 2, which does not have a partner to which the electric power is transmitted, in accordance with the increase of the position gap. The maximum value of the received electric power of the second secondary-side resonant coil 3 is about 170% and the maximum value of the received electric power of the fourth secondary-side resonant coil 3 is about 135%.

In this way, in a case where any of the PCs 500 is missing, the received electric power of the secondary-side resonant coils 3 included in the power receivers 20 of the PCs 500 before and after the missing PC 500 increases. It is preferable to adjust transmitted electric power because overcharge of the battery of the PC 500 or the like may occur when the received electric power excessively increases.

Thus, according to the power transmitting apparatus 300 of the third embodiment, in a case where the PC 500 is missing, the controller 340 controls the amplification factors of the amplifiers 130 connected to the power transmitters 110 corresponding to the PCs 500 before and after the missing PC 500. Further, the PC 500 missing occurs in a case where the PC 500 does not pass the operation confirmation test. Because a pass rate for the operation confirmation test is very high and is nearly equal to 100%, it is rare that the PC 500 does not pass the operation confirmation test.

Accordingly, because it is unlikely in normal cases that a plurality of PCs 500 are continuously missing, a case is considered where any one of the PCs 500 is missing when the N PCs 500 are conveyed by the conveying belt 400.

Figure 11:
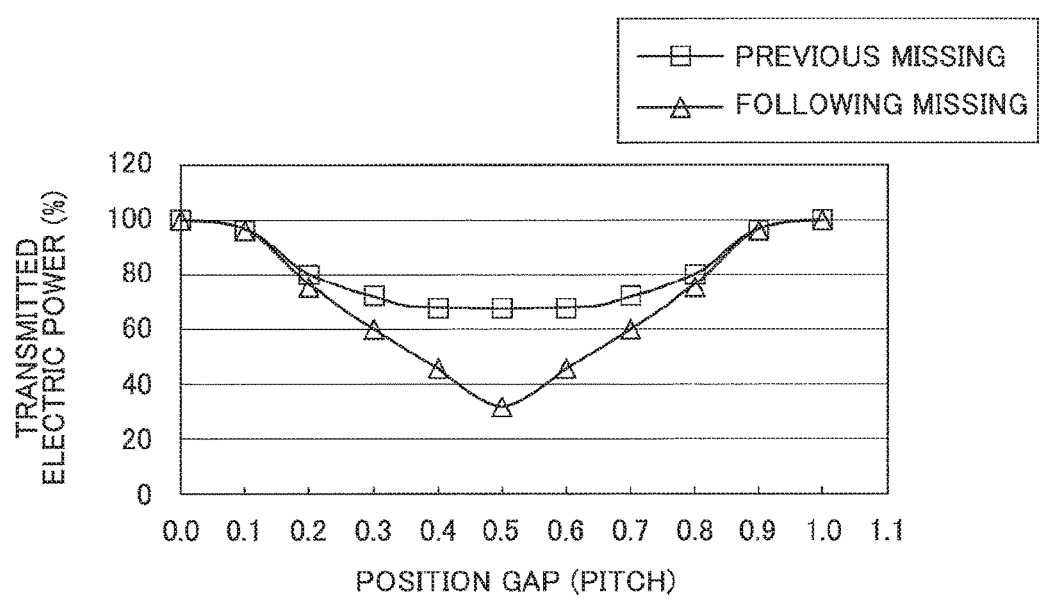
FIG. 11 is a diagram illustrating characteristics of the transmitted electric power with respect to the position gap in the power transmitting apparatus of the third embodiment.

FIG. 11 is a diagram illustrating characteristics of the transmitted electric power with respect to the position gap in the power transmitting apparatus 300 of the third embodiment. The characteristics illustrated in FIG. 11 are the control data stored in the internal memory of the controller 340. The control data are used to control the amplification factors of the amplifiers 130-1 to 130-N.

Here, the position gap is a position gap of the power receivers 20-1 to 20-N relative to the power transmitters 110-1 to 110-N. Further, the transmitted electric power illustrated in FIG. 11 expresses the electric power transmitted from the power transmitters 110-1 to 110-N in percentage figures (%). Here, 100% expresses the above described reference value of the transmitted electric power.

FIG. 11 illustrates characteristics of transmitted electric power of "previous missing" and transmitted electric power of "following missing". In a case where a PC 500 one PC before a certain PC 500 corresponding to a certain power transmitter 110 is missing, the characteristics of "previous missing" are characteristics for adjusting the transmitted power of the certain power transmitter 110. For example, in a case where the second PC 500-2 is missing as illustrated in FIG. 9, the characteristics of "previous missing" are used by the controller 340 to control the amplification factor of the amplifier 130-1 connected to the power transmitter 110-1 corresponding to the PC 500-1.

Further, in a case where a PC 500 one PC after a certain PC 500 corresponding to a certain power transmitter 110 is missing, the characteristics of "following missing" are characteristics for adjusting the transmitted power of the certain power transmitter 110. For example, in a case where the second PC 500-2 is missing as illustrated in FIG. 9, the characteristics of the "following missing" are used by the controller 340 to control the amplification factor of the amplifier 130-3 connected to the power transmitter 110-3 corresponding to the PC 500-3.

As described above, the transmitted electric power of "following missing" is set to be lower than that of "previous missing" because the PC 500 one before (upstream side) a place where the PC 500 is missing becomes closer to the primary-side resonant coil 2 of the power transmitter 110, which does not have a partner to which the electric power is transmitted, in accordance with the increase of the position gap.

Further, when the position gap is 0.5 pitch, the received electric power from the primary-side resonant coil 2 of the power transmitter 110, which does not have a partner to which the electric power is transmitted, becomes maximum in both cases of "previous missing" and "following missing". Accordingly, the transmitted electric power of "previous missing" and the transmitted electric power of "following missing" are set to have characteristics to be minimum when the position gap is 0.5 pitch as illustrated in FIG. 11.

Because the conveying belt 400 always moves, a place where the PC 500 is missing moves to the downstream side from the upstream side in the power transmitting zone with time. The amplifiers 130 corresponding to "previous missing" and "following missing" change in accordance with such a movement.

Accordingly, after detecting missing of the PC 500 based on a detection result of the passing detector 150, the controller 340 may periodically switch the amplifiers 130 corresponding to "previous missing" and "following missing" to control the amplification factors based on the moving speed of the conveying belt 400, the length of the power transmitting zone, and the interval between the power transmitters 110-1 to 110-N.

Figure 12:
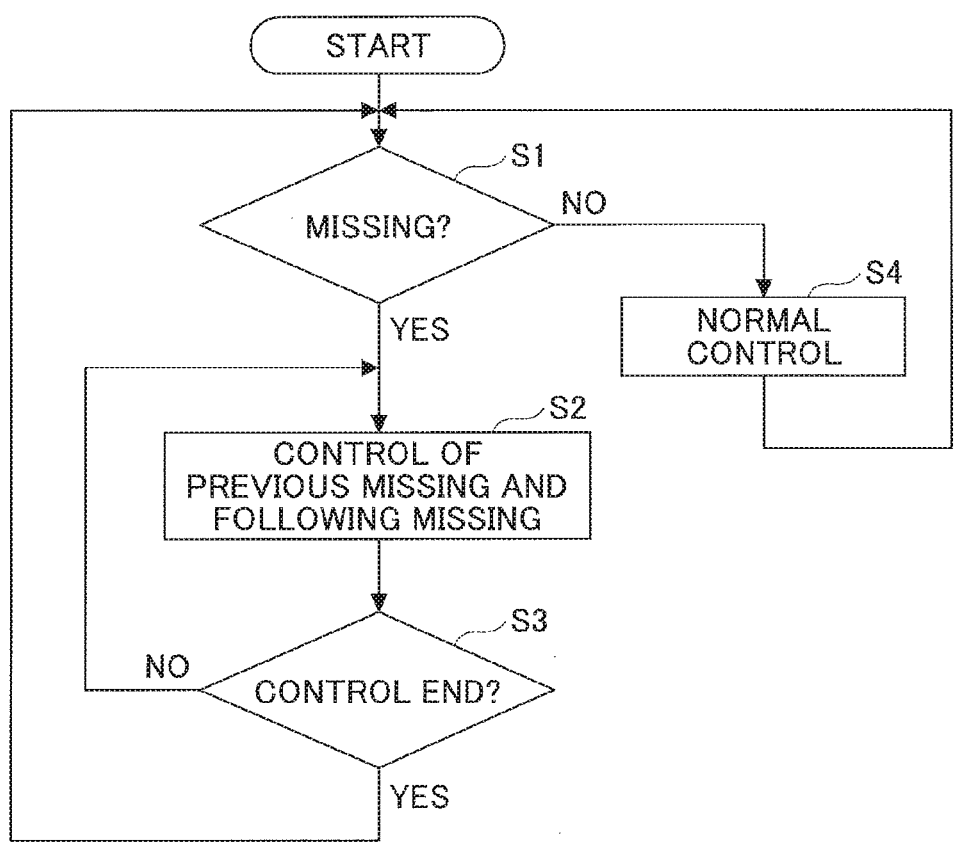
FIG. 12 is a flowchart illustrating processing executed by a controller of the power transmitting apparatus of the third embodiment.

FIG. 12 is a flowchart illustrating processing executed by the controller 340 of the power transmitting apparatus 300 of the third embodiment. The flow starts when power is applied to the power transmitting apparatus 300.

The controller 340 determines whether missing of the PC 500 is present (at step S1). The controller 340 may determine whether or not the missing of the PC 500 is present depending on whether a signal that detects passing of the PC 500 is periodically input from the passing detector 150 to the controller 340. This is because the signal that detects passing of the PC 500 is periodically input, from the passing detector 150 to the controller 340, at predetermined time intervals when the plurality of PCs 500 continuously pass the operation confirmation test.

In a case where the controller 340 has determined that the missing is present (YES at step S1), the controller 340 uses the control data representing the characteristics illustrated in FIG. 11 to control the amplification factors of "previous missing" and "following missing" (step S2). In this way, the amplification factors of the amplifiers 130 connected to the power transmitters 110 corresponding to the PCs 500 before and after the missing PC 500 are controlled in accordance with the characteristics illustrated in FIG. 11.

Further, as described above, because the conveying belt 400 always moves and the place where the PC 500 is missing moves to the downstream side from the upstream side in the power transmitting zone with time, the controller 340 periodically switches the amplifiers 130 corresponding to "previous missing" and "following missing" to control the amplification factors.

The controller 340 determines at step S3 whether to finish the control according to step S2. This is because it becomes unnecessary to perform the control at step S2 in a case where the PCs 500 are conveyed one after another by the conveying belt 400 and the missing of the PC 500 disappears.

Specifically, the controller 340 finishes the control according to step S2 at a time point when a predetermined time has passed after the amplifier 130, which performs the control for "following missing", reaches the amplifier 130-N. In a case where the controller 340 has determined to finish the control according to step S2 (YES at step S3), the flow returns to step S1.

Further, in a case where the controller 340 has determined that missing is not present (NO at step S1), the controller 340 performs normal control for the amplifiers 130-1 to 130-N (step S4). The normal control is control for setting the amplification factor to be the reference value. In this way, the transmitted electric power of the power transmitters 110-1 to 110-N is set to the reference value (100%).

Further, in a case where the controller 340 has determined that the control is not finished (NO at step S3), the flow returns to step S2 and the controller 340 repeatedly executes the processing at step S2 until determining that the control is finished.

As described above, the controller 340 performs the control of the amplification factors for "previous missing" and "following missing".

According to the above described third embodiment, it becomes possible to provide the power transmitting apparatus 300 that can effectively transmit the electric power to the plurality of power receivers 20 even when it occurs that a PC 500 does not pass the operation confirmation test and missing of the PC 500 occurs in the power transmitting zone.

Here, the amplification factor of the amplifier 130 located between the amplifiers 130 corresponding to "previous missing" and "following missing" may be set to be the reference value. The reference value of the amplifier 130 is an amplification factor for realizing the reference value (100%) of the transmitted electric power.

Further, the amplification factors of the amplifiers 130 except for the three amplifiers 130 corresponding to the three from "previous missing" to "following missing" may be set to be the reference value, or may be corrected based on the characteristics illustrated in FIG. 7 in accordance with the position gap similarly to the controller 140 of the first embodiment.

Although examples of a power transmitting apparatus according to the embodiments of the present invention have been described, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the sprit and scope of the invention.

What is claimed is:

1. A power transmitting apparatus comprising:
a plurality of primary-side resonant coils disposed along a conveyance path of a conveying belt to convey a plurality of electronic devices and configured to utilize magnetic field resonance to transmit electric power to a plurality of secondary-side resonant coils of the plurality of electronic devices conveyed on the conveyance path; and
a plurality of phase adjusters connected between an alternating-current source and the plurality of primary-side resonant coils and configured to respectively adjust phases of the electric power supplied to the plurality of primary-side resonant coils from the alternating-current source, so as to make uniform the phases of the electric power supplied to the plurality of primary-side resonant coils from the alternating-current source.

2. The power transmitting apparatus according to claim 1, wherein the plurality of phase adjusters are respectively a plurality of phase adjusting circuits connected between the alternating-current source and the plurality of primary-side resonant coils.

3. The power transmitting apparatus according to claim 1, wherein the plurality of phase adjusters are a plurality of transmission channels where transmission distances of the electric power between the alternating-current source and the plurality of primary-side resonant coils are adjusted so as to make uniform the phases of the electric power supplied to the plurality of primary-side resonant coils from the alternating-current source.

4. A power transmitting apparatus comprising:
a plurality of primary-side resonant coils disposed along a conveyance path of a conveying belt to convey a plurality of electronic devices and configured to utilize magnetic field resonance to transmit electric power to a plurality of secondary-side resonant coils of the plurality of electronic devices conveyed on the conveyance path;
a plurality of phase adjusters connected between an alternating-current source and the plurality of primary-side resonant coils and configured to respectively adjust phases of the electric power supplied to the plurality of primary-side resonant coils from the alternating-current source, so as to make uniform the phases of the electric power supplied to the plurality of primary-side resonant coils from the alternating-current source;
a position detector configured to detect positions of the plurality of electronic devices, relative to the plurality of primary-side resonant coils, conveyed on the conveyance path;
a plurality of amplifiers connected between the alternating-current source and the plurality of primary-side resonant coils and configured to amplify the electric power supplied to the plurality of primary-side resonant coils from the alternating-current source; and
a controller configured to adjust amplification degrees of the electric power in the plurality of amplifiers based on the positions of the plurality of electronic devices detected by the position detector.

5. The power transmitting apparatus according to claim 4, wherein the controller increases the amplification degrees of the electric power in the plurality of amplifiers as a position gap between the plurality of electronic devices and the plurality of primary-side resonant coils increases.

6. The power transmitting apparatus according to claim 4, further comprising:
a passing detector configured to detect passing of the plurality of electronic devices conveyed on the conveyance path,
wherein, when the controller determines, based on a detection result of the passing detector, that an electronic device corresponding to one of the plurality of primary-side resonant coils is not present, the controller decreases amplification degrees of a pair of amplifiers corresponding to a pair of primary-side resonant coils located before and after the one of the plurality of primary-side resonant coils corresponding to the electronic device that is not present on the conveyance path.

7. The power transmitting apparatus according to claim 6, wherein the controller adjusts the amplification degrees of the pair of amplifiers corresponding to the pair of primary-side resonant coils located before and after the one of the plurality of primary-side resonant coils corresponding to the electronic device that is not present on the conveyance path, based on the positions of the plurality of electronic devices detected by the position detector.

8. The power transmitting apparatus according to claim 6, wherein the amplification degrees of the pair of amplifiers corresponding to the pair of primary-side resonant coils are different from each other.

9. The power transmitting apparatus according to claim 1, further comprising:
a plurality of primary-side coils connected to the alternating-current source and configured to utilize electromagnetic induction to respectively supply the electric power to the plurality of primary-side resonant coils from the alternating-current source.

10. The power transmitting apparatus according to claim 4, wherein the controller increases an amplification degree of the electric power in one of the plurality of amplifiers as a position gap between one of the plurality of electronic devices and one of the plurality of primary-side resonant coils corresponding to the one of the plurality of amplifiers increases.

* * * * *